United States Patent Office 3,026,353
Patented Mar. 20, 1962

3,026,353
OZONE OXIDATION ON SOLID CATALYSTS
Simon Frank, Stamford, and Allan M. Feldman, Old Greenwich, Conn., assignors to American Cyanamid Company, New York, N.Y., a corporation of Maine
No Drawing. Filed Feb. 20, 1959, Ser. No. 794,524
8 Claims. (Cl. 260—531)

This invention relates to the production of dibasic acids. More particularly, this invention relates to catalytic oxidation of a cycloalkane with ozone in the presence of a metallic or metalloid oxide substrate.

The ozone oxidation of cycloalkanes to form dibasic acids is rare in the prior literature. Durland et al. J. Am. Chem. Soc. 61, February 1939, pp. 429–33, teach that ozone oxidation of cyclohexane is a very inefficient and time-consuming process when ozone is merely bubbled through liquid cyclohexane. In this article Durland discloses ozonizing cyclohexane for 100 hours to get only a little over 10% yield. In addition, many other compounds are formed including formic acid, "ketonic" material and other oxidation products. Moreover, Durland et al. describe cyclohexane to be the cyclic hydrocarbon which is most resistant to ozone.

Applicants have found that these cycloalkanes and their partially oxidized derivatives may be easily and more efficiently oxidized to their corresponding dibasic acids when mixtures of the cycloalkane vapor and ozone are passed through a catalyst substrate of a finally divided metallic oxide such as silca or alumina. It was quite unexpected that this procedure did not end in complete breakdown of the cycloalkane molecule to carbon dioxide and water since U.S. Patent 2,809,882 to Grosse et al. uses a related process employing ozone to completely oxidize organic material in order to purify oxygen. Moreover, the Grosse et al. patent is based on the fact that more complete combustion occurs than is expected since less than stoichiometric quantities of ozone are needed to fully oxidize the impurities in oxygen. It is noted that Grosse et al. have nearly 100% oxidation to carbon dioxide and water.

Reaction temperatures may be any temperature where it is possible to get the alkane into a vaporous mixture with the ozone. 200° C.–300° C. is the threshold temperature for "cool flame" burning of hydrocarbons and probably should not be exceeded to avoid any unforeseen complications.

It is interesting to note that applicants' process is excellent for producing adipic acid which is one of the reactants employed in the making of nylon. The adipic acid produced by applicants' process is for the most part color free and obtained in over 50% yields. Furthermore, only one step is involved making possible direct oxidation from cyclohexane to adipic acid.

Attention is drawn to the fact that this phenomenon may be extended to the cycloalkanone and cycloalkanol derivatives of the cycloalkanes and therefore the invention necessarily encompasses the oxidation of all cyclic compounds having this peculiar property to form dibasic acids, although those cyclic compounds having 5 to 8 carbon atoms are preferred.

It is an object of the present invention to provide a novel process for the production of dibasic acids.

Another object is to provide a process for the production of adipic acid directly from cyclohexane in which the conversion takes place rapidly.

A further object is to provide a process for making adipic acid whereby adipic acid free from coloration is obtained.

Other and further objects of the invention will more fully appear in the further description and embodiments of the invention.

Applicants' process merely entails mixing ozone with vapors of a cycloalkane and passing the gaseous mixture through a particular catalyst. The resulting product is left on the catalyst and is subsequently eluted with a solvent. The preferred method is to bubble an ozone-containing gas through the liquid cycloalkane and pass the cycloalkane vapor laden ozone mixture through a column packed with finely divided silica. The oxidation products, which are mainly a dibasic acid, are then removed by eluting the finely divided packing with a solvent for the acid such as hot or cold water.

The herein disclosed process may be easily adapted to a continuous process by providing a vertical catalytic tower, containing a downwardly moving catalyst wherein the reaction mixture is passed up through the catalyst. As the product is formed it is absorbed on the catalyst surface and passes with the catalyst into contact with a solvent. This mixture is then conveyed to a separator where the product is recovered in solution and after appropriate treatment the catalyst is again recycled through the catalytic tower. Other schemes can be envisaged in which the catalyst moves in the same direction as the gas flow.

The procedure employed was virtually identical for all the examples given in the table below. The catalyst was placed in a vertical Pyrex glass tube supported by a sintered glass disk sealed to the tube near the lower end. To the bottom of the tube was attached a Pyrex flask containing the material to be oxidized. An ozone-containing gas was introduced through a side arm on the flask and passed through the material to be oxidized. The upper end of the tube was attached to a trap cooled to −78° C. which removed any unreacted starting material. The gases leaving the trap were analyzed for unreacted ozone and oxygen content, and finally passed through a wet test meter to determine the volume of gas used in the experiment. The temperature of the liquid in the flask was controlled by immersing the flask in a water bath of the desired temperature. The catalyst was heated, when necessary, by an electrical heating tape wound externally around the tube. The temperature of the catalyst was measured by a thermocouple inserted between the heating tape and the tube. The concentration of ozone was determined by reacting the ozone in a measured volume of gas with a potassium iodide solution and titrating the iodine produced with standard sodium thiosulfate.

After completion of the reaction the catalyst was eluted with an appropriate solvent. The product was identified as dibasic acid by its infrared spectrum, melting point, and mixed melting point with an authentic sample of the dibasic acid. The amount of acid produced was determined by titration with standard sodium hydroxide.

| Compound | C.C. | Temp. Liquid, °C. | Catalyst, gm. | Temp. Catalyst, °C. | Ozone Conc.* M. Moles/L. | Volume of Gas, L. | Ozone Reacted, M. Moles | Eluting Solvent | Product |
|---|---|---|---|---|---|---|---|---|---|
| Cyclohexane | 10 | Ambient | $SiO_2$, 12.3 | Ambient | 0.90 | 45 | 40.5 | Ether | M.P. and mixed M.P. 145–148° C. infrared: adipic acid. |
| Do | 10 | 50 | $SiO_2$, 20.0 | Ambient | 0.90 | 10 | 9 | Ether | Infrared: adipic acid. |
| Do | 10 | 50 | $SiO_2$, 5.0 | Ambient | 0.90 | 18 | 16.2 | Ether | Do. |
| Do | 10 | Ambient | $Al_2O_3$, 12.3 | Ambient | 0.80 | 23 | 10.3 | Ether, Methanol, Acetic Acid. | 0.68 M. moles cyclohexanone; 3.3 M. moles adipic acid. |
| Cyclohexanol | 10 | 75 | $SiO_2$ | 100 | 0.975 | 28 | 27.3 | Ether | 3.7 M. moles adipic acid. |
| Cyclohexanone | 50 | 75 | $SiO_2$, 10 | 105 | 0.77 | 229 | 176.0 | Hot water | 77.7 M. moles adipic acid; M.P. and mixed M.P. 148.5–153° C. |
| Cyclopentane | 10 | Ambient | $SiO_2$, 20 | Ambient | 0.785 | 40 | 31.4 | Ether | Infared: Glutaric acid—M.P. 91–94° C. |
| Cyclooctane | 10 | 48 | $SiO_2$, 20 | Ambient | 0.835 | 40.5 | 33.8 | Ether | Infrared: Suberic acid—M.P. 139–142° C. |

*M. Moles=millimoles.

Composition of the catalyst does not seem to be critical although the surface areas of the catalyst are important. Generally the greater the surface area, the more efficient the reaction. However, the reaction will proceed satisfactorily at surface areas as low as 100 sq. m./g. When the catalyst is used continuously, it becomes progressively weaker and less efficient. Apparently this is the result of product deposition which continuously covers the catalyst leaving progressively a lesser amount of exposed surface area to act as a catalyst. This theory is thought to be borne out by the fact that the catalyst can be reconstituted to act with its original efficiency by removing the adsorbed product by elution. Unless there is sufficient surface area exposed, the catalyst is impractical because it becomes inactive too rapidly. Typical materials which may be used as catalysts are chromatographic alumina and silica gel. This theory is further borne out by the fact that the inactive catalyst contains the acid product in quantities sufficient to have a layer approximately 3 A. thick on the entire catalyst surface. This suggests that the catalyst is coated with a layer of product about one molecule in thickness.

Not only are silica gel and alumina operative by themselves, but mixtures of the two in all proportions are operative.

In addition to silica gel and alumina, applicants have found catalysts such as $V_2O_5$ on diatomaceous earth and mixtures of $SiO_2$, $V_2O_5$ and $K_2S_2O_7$ to be operative.

The above process may be used to produce other compounds from their source compounds. For example, ethanol may be oxidized to acetaldehyde, while cis-decalin, isobutane, isopentane, lactonitrile, methylethyl acetic acid give acid products and propionitrile gives amides.

We claim:
1. A process for making aliphatic dibasic acids which comprises passing ozone through a liquid cyclic compound having from 5 to 8 carbon atoms selected from the group consisting of a cycloalkane, a monoketocycloalkane, and a monohydroxy cycloalkane to produce a vaporous mixture of ozone and said cyclic compound, passing said vaporous mixture through a catalyst having a surface area of at least 100 sq. meters per gram selected from the group consisting of $SiO_2$, $Al_2O_3$ and mixtures thereof at a temperature of from about ambient to about 200° C.
2. A process according to claim 1 wherein the aliphatic dibasic acid product is subsequently eluded from the catalyst.
3. A process for making adipic acid which comprises passing ozone through liquid cyclohexane to produce a vaporous mixture of ozone and cyclohexane, passing said vaporous mixture through a catalyst having a surface area of at least 100 sq. meters per gram selected from the group consisting of $SiO_2$, $Al_2O_3$ and mixtures thereof at a temperature of from about ambient to about 200° C.
4. A method according to claim 1 wherein the liquid cyclic compound is cyclooctane.
5. A method according to claim 1 wherein the liquid cyclic compound is cyclohexanone.
6. A method according to claim 1 in which the liquid cyclic compound is cyclohexanol.
7. A method according to claim 1 wherein the catalyst is $SiO_2$.
8. A method according to claim 1 wherein the catalyst is $Al_2O_3$.

References Cited in the file of this patent

UNITED STATES PATENTS

| | | |
|---|---|---|
| 2,020,671 | Dreyfus | Nov. 12, 1935 |
| 2,206,377 | Weiss | July 2, 1940 |
| 2,849,484 | Clingman | Aug. 26, 1958 |
| 2,883,420 | Bullock et al. | Apr. 21, 1959 |

OTHER REFERENCES

Durland et al.: Jour. Amer. Chem. Soc., volume 61, pages 429–33 (1939).

Clingman, Jr. et al., Ind. and Eng. Ch., volume 50, pages 1257–58 (1958).